(12) United States Patent
Kolkowitz et al.

(10) Patent No.: US 11,733,537 B2
(45) Date of Patent: Aug. 22, 2023

(54) SUPER-RESOLUTION OPTICAL MICROSCOPE

(71) Applicant: Wisconsin Alumni Research Foundation, Madison, WI (US)

(72) Inventors: Shimon Kolkowitz, Madison, WI (US); Aedan Gardill, Madison, WI (US); Matthew Cambria, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 0 days.

(21) Appl. No.: 17/466,502

(22) Filed: Sep. 3, 2021

(65) Prior Publication Data

US 2023/0071083 A1 Mar. 9, 2023

(51) Int. Cl.

| G02B 21/06 | (2006.01) |
|---|---|
| G02B 27/58 | (2006.01) |
| G02B 5/18 | (2006.01) |
| G02B 21/36 | (2006.01) |
| G02B 27/42 | (2006.01) |
| G01N 21/64 | (2006.01) |
| G02B 21/16 | (2006.01) |

(52) U.S. Cl.
CPC ......... *G02B 27/58* (2013.01); *G01N 21/6458* (2013.01); *G02B 5/1842* (2013.01); *G02B 21/06* (2013.01); *G02B 21/16* (2013.01); *G02B 21/365* (2013.01); *G02B 27/4205* (2013.01); *G01N 2021/6463* (2013.01)

(58) Field of Classification Search
CPC ...... G02B 27/58; G02B 5/1842; G02B 21/06; G02B 21/16; G02B 21/365; G02B 27/4205; G01N 21/6458; G01N 2021/6463
See application file for complete search history.

(56) References Cited

U.S. PATENT DOCUMENTS

| 9,921,161 B1* | 3/2018 | Feldkhun | G01N 21/6458 |
|---|---|---|---|
| 10,197,497 B2* | 2/2019 | Kolkowitz | G01K 11/006 |
| 10,247,672 B2* | 4/2019 | Betzig | G01N 21/6458 |
| 10,436,915 B2* | 10/2019 | Teshigawara | A61B 6/037 |
| 10,524,664 B2* | 1/2020 | Liu | A61B 5/145 |
| 10,721,441 B2* | 7/2020 | Betzig | H04N 7/18 |
| 10,914,930 B2* | 2/2021 | Peng | G02B 21/0032 |
| 2012/0287244 A1* | 11/2012 | Bennett | G02B 21/16 |
| | | | 348/46 |
| 2013/0286179 A1* | 10/2013 | Markle | G01N 21/6458 |
| | | | 348/78 |
| 2014/0340482 A1* | 11/2014 | Kanarowski | G02B 21/16 |
| | | | 348/46 |

(Continued)

OTHER PUBLICATIONS

Vangindertael et al. (An introduction to optical super-resolution microscopy for the adventurous biologist; IOP Publishing; Methods Appl. Fluoresc. 6 (2018) Feb. 2003). (Year: 2018).*

(Continued)

*Primary Examiner* — David P Porta
*Assistant Examiner* — Djura Malevic
(74) *Attorney, Agent, or Firm* — Boyle Fredrickson, S.C.

(57) ABSTRACT

A super-resolution microscope avoids the need for complex phase plate optics normally used to produce a doughnut-shaped depletion beam by employing low-intensity regions of common diffraction patterns such as an Airy disk.

20 Claims, 4 Drawing Sheets

(56) References Cited

U.S. PATENT DOCUMENTS

| | | | | |
|---|---|---|---|---|
| 2015/0212308 A1* | 7/2015 | Sirat | ................. | G01N 21/6458 |
| | | | | 250/459.1 |
| 2016/0195705 A1* | 7/2016 | Betzig | ................... | G02B 27/58 |
| | | | | 348/79 |
| 2017/0322406 A1* | 11/2017 | Sirat | ...................... | G02B 21/16 |
| 2017/0336326 A1* | 11/2017 | Sirat | ................. | G02B 21/0056 |
| 2018/0059475 A1* | 3/2018 | Lee | ........................ | B29D 11/00 |
| 2018/0275057 A1* | 9/2018 | Kolkowitz | ........... | G01R 33/032 |
| 2022/0163440 A1* | 5/2022 | Pertsinidis | ......... | G01N 15/1468 |

OTHER PUBLICATIONS

Hao et al.,Point-spread function optimization in isoSTED nanoscopy,Optics Letters vol. 40, Issue 15, pp. 3627-3630 (2015) (Year: 2015).*

Curdt et al. isoSTED nanoscopy with intrinsic beam alignment, vol. 23, Issue 24, pp. 30891-30903 (2015) (Year: 2015).*

Reuss et al., Birefringent device converts a standard scanning microscope into a STED microscope that also maps molecular orientation , Jan. 18, 2010/vol. 18, No. 2/Optics Express 1049 (Year: 2010).*

\* cited by examiner

SUPER-RESOLUTION OPTICAL MICROSCOPE

STATEMENT REGARDING FEDERALLY SPONSORED RESEARCH OR DEVELOPMENT

This invention was made with government support under DE-SC0020313 awarded by the US Department of Energy. The government has certain rights in the invention.

CROSS REFERENCE TO RELATED APPLICATION

Background of the Invention

The present invention relates to light microscopes and, in particular, to a simplified super-resolution microscope of a type resolving features smaller than the diffraction limits of the optical system.

Optical microscopes provide a lens system capable of capturing light from a material under investigation, for example, using a microscope objective lens and producing a magnified image at an eyepiece or camera. A confocal microscope is a type of microscope used to isolate light from the focal point of the objective lens, greatly increasing the contrast and resolution of images. However, the resulting resolution of the confocal microscope is typically constrained by a diffraction limit related to the aperture of the microscope and the wavelength of the light. This diffraction limit describes the smallest separation between imaged objects that can be resolved and, relatedly, the smallest spot at which light can be focused.

Super-resolution microscopes can be constructed to distinguish structures smaller than, or separated by less than the diffraction limit when the structures include a fluorescent material providing emitted light as a nonlinear function of its stimulation, for example, a saturation threshold of illumination. These materials can respond selectively to a given threshold of illumination to effectively turn an unsharp, diffraction-limited beam of illumination into a spatially sharp edge when the beam is scanned over the material surface.

One common implementation of this technique, known as stimulated emission depletion (STED), requires the production of a "doughnut" beam shape, with a central "doughnut hole" of lower intensity surrounded by an annulus of high intensity. In STED, a fluorescent sample is excited by an excitation laser, typically at a first wavelength and then depleted by a different laser using a "doughnut" of illumination at a second wavelength. The "doughnut," for example, may be produced with a specially designed "vortex plate" optical element. The bright doughnut around the doughnut hole causes excited fluorophores to return to their ground states by stimulated emission so that ultimately only light emitted by fluorophores within the field zero of the doughnut hole will be collected. While the generation of the "doughnut hole" is also subject to the diffraction limit of the optics, the nonlinear response of the fluorophores allow investigation of spatial areas which can be smaller than the diffraction limit of the excitation laser in the same system. Super-resolution microscopes using STED techniques are often an extension of the more common confocal microscope, but with the added complexity of multiple aligned lasers (for excitation and depletion) and specially prepared vortex or phase plates or their equivalent to produce the defining doughnut beam pattern.

SUMMARY OF THE INVENTION

The present invention provides a super-resolution microscope that exploits the properties of common optical diffraction patterns to eliminate the vortex plate and, in some cases, to allow super-resolution imaging with standard confocal microscope optics. Diffraction is produced whenever a wavefront of light is passed through an aperture, such as a pinhole or lens, where some portion of the wavefront is blocked. Diffraction can be distinguished from refraction which involves light moving between different media with different indices of refraction producing a phase delay. In some embodiments, for example, when used with the imaging of nitrogen vacancies in diamond, the invention can employ a single laser for excitation and depletion greatly simplifying the construction of a super-resolution microscope in applications such as sensors and quantum computation.

More specifically, the invention provides a super-resolution microscope having: at least one laser; a light sensor; and a diffraction element positioned between the at least one laser and a material of interest to project a diffraction pattern in the material of interest at the measurement region providing a region of low light intensity flanked by regions of higher light intensity, the region of low light intensity having a width with an intensity insufficient to deplete a predetermined fluorescent emitter and less than the diffraction limit for light of the laser, the regions of higher intensity having an intensity sufficient to deplete the fluorescent emitters and an electronic computer executing a program stored in non-transitory media to: (a) control the at least one laser to initialize a fluorescent point emitter in the material of interest into a preferred initial state; (b) control at least one laser to project a first diffraction pattern on the material of interest so that the point emitter is positioned within the region of low light intensity and the florescence outside of the region of low light intensity is depleted; and (c), after (b), detect emitted light from the substrate to provide a high spatial resolution measurement of emitted light constrained by the region of low light intensity.

It is thus a feature of at least one embodiment of the invention to make use of a diffraction pattern for isolating, by super resolution, a portion of a structure of interest in lieu of a specially constructed refractive element.

The region of low light intensity may have a width between the regions of higher light intensity less than half the diffraction limit for light of the at least one laser.

It is thus a feature of at least one embodiment of the invention to provide super resolution comparable or better than other super resolution techniques.

The stimulation of fluorescence of the at least one point emitter may employ a second diffraction pattern having a region of low light intensity and a region of higher light intensity, the region of higher light intensity of the second diffraction pattern aligned with the region of lower light intensity of the first diffraction pattern.

It is thus a feature of at least one embodiment of the invention to allow diffraction patterns (possibly with the same optical element) for each of stimulation, depletion, and readout of the florescence.

In one embodiment, the stimulation of fluorescence of the at least one point emitter may employ a second diffraction pattern offset from the first diffraction pattern perpendicular to a direction of light propagation.

It is thus a feature of at least one embodiment of the invention to provide a simple implementation that does not require extensive modification of the optics of a confocal microscope but that can be implemented simply by motion of a stage or the like. It is yet another feature of at least one embodiment of the invention to allow a simple linear scanning of the material of interest when an image is desired.

The high spatial resolution image may map light from the point emitter in the material of interest to multiple pixels in a radius about a location of the point emitter in the high spatial resolution image, the radius corresponding to a radius of the first intensity minimum ring of an Airy disk diffraction pattern, and the electronic computer may provide a human-readable output to a user through the user interface derived from a combination of the multiple pixels.

It is thus a feature of at least one embodiment of the invention to exploit redundant measurements possible with the present invention for improved signal quality.

The electronic computer may identify different sets of multiple pixels corresponding to different point emitters and isolates values of the different sets of multiple pixels to particular point emitters to provide different outputs associated with different point emitters.

It is thus a feature of at least one embodiment of the invention to permit separate measurements of point emitters by using the known pattern of the multiple pixels to uniquely map the pixels to different point emitters.

In this case, the electronic computer may identify overlap regions to provide a different weighting to the overlap region compared to regions that do not overlap in the combination of the multiple pixels to provide the output for each point emitter.

It is thus a feature of at least one embodiment of the invention to permit independent measurements of point emitters that are in close proximity such that there is overlap between their emitted light in the scan image.

In one embodiment the focal plane of the diffraction pattern may be offset from a plane of the fluorescent emitter.

It is thus a feature of at least one embodiment of the invention to adjust the height of the diffraction lobes to improve a sharpness producing superior super-resolution.

In some embodiments, the region of low light intensity may be at a center of the diffraction pattern and the regions of higher light intensity are a ring around the region of low light intensity.

It is thus a feature of at least one embodiment of the invention to provide a diffraction pattern that closely mimics the doughnut-shaped light pattern possible with the vortex plate to provide direct imaging of point emitters.

The super-resolution microscope may further include a material of interest of diamond with nitrogen vacancies and wherein the light is collected from nitrogen vacancies.

It is thus a feature of at least one embodiment of the invention to provide a simple implementation of a sensor system, for example, suitable for quantum computers and the like.

These particular objects and advantages may apply to only some embodiments falling within the claims and thus do not define the scope of the invention.

DETAILED DESCRIPTION OF THE PREFERRED EMBODIMENT

Figure 1:
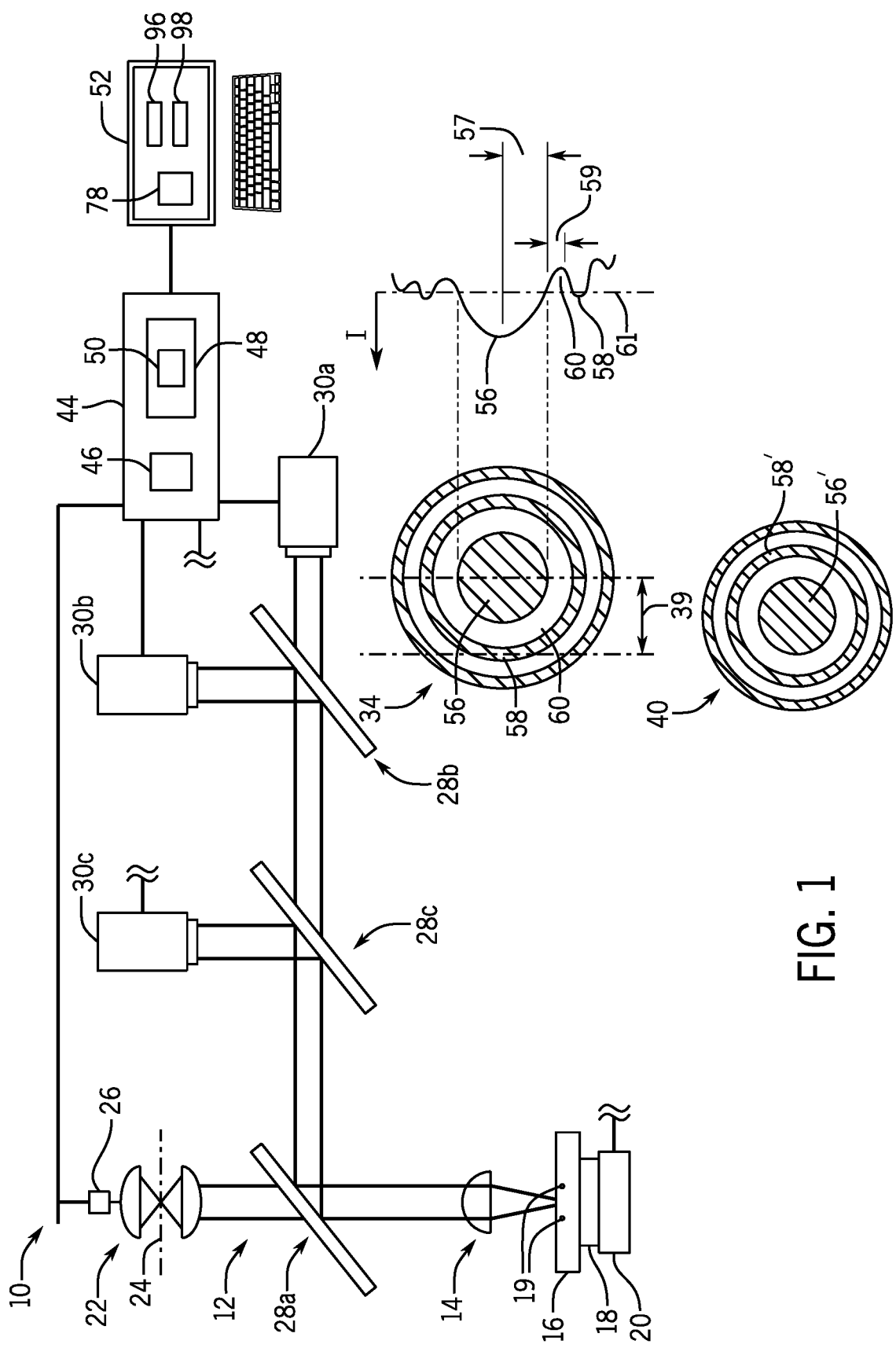
FIG. 1 is a block diagram of a microscope according to one embodiment of the present invention producing an Airy disk diffraction pattern used for super-resolution imaging of fluorescent structures in a material of interest.

Referring now to FIG. 1 a super-resolution microscope 10 suitable for practice of the present invention may provide for the basic features of a confocal microscope including a microscope body 12 having a microscope objective lens 14 positionable above the material of interest 16 for viewing of the same. The material of interest 16 may be supported by a stage 18 having an x-y actuator 20 allowing the stage to be moved beneath or with respect to the objective lens 14 as will be discussed below. Generally, the material of interest will have one or more point emitters 19 providing fluorescence under situations of excitation by laser light, for example, according to the techniques of confocal fluorescence microscopy.

In one non-limiting example, the point emitters 19 may be nitrogen vacancies in diamond. Nitrogen vacancies are point defects that may be used as various components in quantum information processing applications, or as sensors capable of detecting highly localized environmental conditions. Accordingly, the present invention may be considered not only a microscope for investigating materials but also as a sensor or component to a machine requiring such sensing. More generally, it will be appreciated that the present invention is not limited to nitrogen vacancies in diamonds but may be used with any stimulable light emitter exhibiting a nonlinear response to excitation adaptable to super-resolution imaging beyond the diffraction limit.

Referring still to FIG. 1, the objective lens 14 of the microscope body 12 is positioned to receive light from the point emitters 19 of the material of interest 16 and communicate it to a collection lens assembly 22. This collection lens assembly 22 may be part of a camera and typically provides a spatial pinhole mask 24 used to filter out light received from outside the focal point 25 of the objective lens 14 per confocal microscopy. After passing through the collection lens assembly 22, the light is received by a light detector 26. The light detector 26 may be a single sensor, for example, a single-photon sensor such as a photomultiplier tube, providing an electrical signal indicating intensity of the received light.

A beam splitter 28a is placed in the path of the light between the objective lens 14 and collection lens assembly 22 and angled to receive light from a first laser 30a. At the beam splitter 28 the light is directed downwardly toward the objective lens 14, which acts as a diffraction mask because of its implicit aperture, resulting in a diffraction pattern 34 formed in the material of interest 16 at the focal plane of the objective lens 14. This diffraction pattern 34 is used for the selective depletion of fluorescence.

A second laser 30b communicates through a second beam splitter 28b positioned between the laser 30b and the beam splitter 28a to produce the second excitation diffraction pattern 40 by light to the beam splitter 28a from the second laser 30b. The light from the second laser 30b may be at a different wavelength than the wavelength of the laser 30a specifically to initialize the emitters 19 into a preferred state. As depicted, this second excitation diffraction pattern 40 may be displaced by an amount 39 generally perpendicular to the propagation of the light, that is having a component of displacement along such a perpendicular axis.

A third laser 30c may communicate through a third beam splitter 28c positioned between the laser 30c and the beam splitter 28 to produce a readout diffraction pattern (acceptably similar to or identical to diffraction pattern 40 in size and location). The light from the third laser 30c may be at a different wavelength than the wavelength of the lasers 30a and 30b to readout light from the emitters 19 and cause fluorescence. This fluorescence is then received by the objective lens 14 and passed to the light detector 26.

It will be appreciated that the diagram of FIG. 1 is simplified for clarity and may include additional lens structures, filters, and the like according to known designs of confocal microscopes.

Each of the lasers 30a, 30b, and 30c, the light detector 26, and the x-y actuator 20 may communicate with a control computer 44 having one or more processors 46 communicating with a computer memory 48 holding a stored program 50 as is generally understood in the art. The computer 44 may communicate with graphics display screen 52 for the output of data and user input devices, such as a mouse or keyboard 54, for control of the microscope 10 as will be discussed generally below.

Referring still to FIG. 1, as well as producing an excitation beam as discussed above, the laser 30a may be configured to create a "depletion beam" presenting an Airy disk diffraction pattern 34 on the material of interest 16. This diffraction pattern 34 is characterized by having a central, high-intensity circular lobe 56 surrounded by one or more ring-shaped intensity bands 58 of lesser strength. Significantly, between the central lobe 56 and the first intensity band 58 is a minimum intensity region 60 having a reduced light intensity of a level 61. As will be discussed further below, this reduced light intensity level 61 defines the size and width 59 of the minimum intensity region 60 and is selected to be insufficient for depletion of point emitters 19 previously initialized into a preferred state by the excitation beam 30b in the material of interest 16 when the point emitters 19 are subsequently scanned by this Airy disk diffraction pattern 34. As such, this width 59 will be substantially less than the diffraction limit of the light of the laser 30a, for example, less than half of that diffraction limit. More generally, the minimum intensity region 60 will be a ring having a diameter 57 centered about the high-intensity circular lobe 56. The central lobe 56 of the diffraction pattern 34 will normally be limited by the diffraction limit, for example, to a width of greater than 200 nm for visible wavelengths of light.

More specifically, by exploiting the nonlinear response of the point emitters 19 to the depletion beam, only those point emitters 19 within the minimum intensity region 60 will be spared from depletion by the depletion beam and thus will fluoresce. Importantly, this minimum intensity region 60 is characterized by a length scale much smaller than the diffraction limit of the system, for example, being less than one half the diffraction limit or less than one quarter of the diffraction limit.

Diffraction pattern 40 may also be an Airy disk and is arranged to illuminate the region 60 during state initialization or readout. This can be done by shifting a center of the diffraction pattern 40 so that its central lobe is positioned over the region 60 or through the use of a different laser light frequency such that a central lobe or first high-intensity ring covers the region 60 without shifting.

Figure 5:
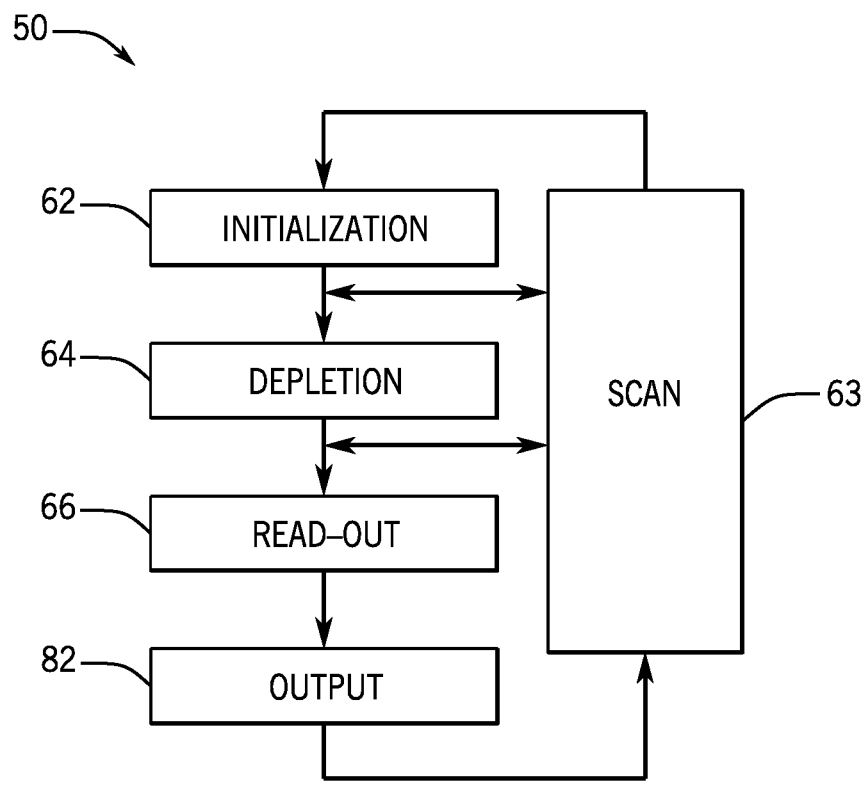
FIG. 5 is a flowchart of a program executed by a controller of the microscope of FIG. 1 in producing an output image of point emitters resolved below the diffraction limit.

Referring to FIGS. 1 and 5, during a sequence under the control of the computer 44 and program 50, at a first process block 62, the computer 44 positions, per process block 63, the material of interest 16, for example, with actuator 20, such that the focal point 25 of laser 30b is scanned through different locations including example location location 74 in material of interest 16 and a pulse from laser 30b is applied to the given location 74, exposing the material of interest 16 to an initialization pulse using the diffraction pattern 40 to initialize the emitter in some preferred state. In this example, it will be assumed that the given location 74 includes a point emitter 19 which has been stimulated within the region 60 of the depletion beam centered on location 74 which will be applied later; however, more generally, for different scan positions 74, this may not be the case. Locations 74 on the material of interest 16 and in the image 78 will be considered the center of the diffraction pattern 34 used for depletion and not necessarily the center of the diffraction pattern 40 used for excitation and readout.

At process block 64, the computer 44 next positions material of interest 16 such that the region 60 overlaps with the stimulated area from diffraction pattern 40 and laser 30a is activated to produce a depletion pattern per diffraction pattern 34. As noted, this diffraction pattern 34 is defined by location 74. Using this diffraction pattern 34, the material of interest 16 and any point emitters in the region of the central lobe 56 and side lobes 58 will be depleted, for example, by photoionization. The point emitters 19 that fall within the region of minimum intensity region 60 will not be depleted.

During the following process block 66, the computer 44 positions the material of interest 16 again in its position that was obtained at process block 62, and a readout pulse using diffraction pattern 40 from laser 30c is applied to the material of interest 16 exciting fluorescence only from the non-depleted emitters 19 in in the region 60, resulting in super resolution isolation of the point emitters 19. This light is then detected by the light detector 26 and recorded by the computer 44 and forms one pixel of a scan image 78 having pixels corresponding to the location Referring now to FIG. 2, in a simple linear scan along a scan line 73a or 73b, light will be detected by the sensor 26 when the depletion diffraction pattern 34 is centered at detection locations 74' displaced from the location 74" of the point emitter 19 by the radius 57 of the region 60. The result is the detection of two symmetric peaks on either side of the location 74" of the point emitter 19. With either linear scan 73a or 73b, the location 74" of the point emitter 19 can be uniquely determined by knowledge that the detection locations 74' must lie on a circle 80 about the location 74" of the point emitter 19 with the radius of the region 60. Two scan lines 73a and 73b distinguish between cases where the scan lines 73 is above or below the location 74" of the point emitter 19.

Figure 3:
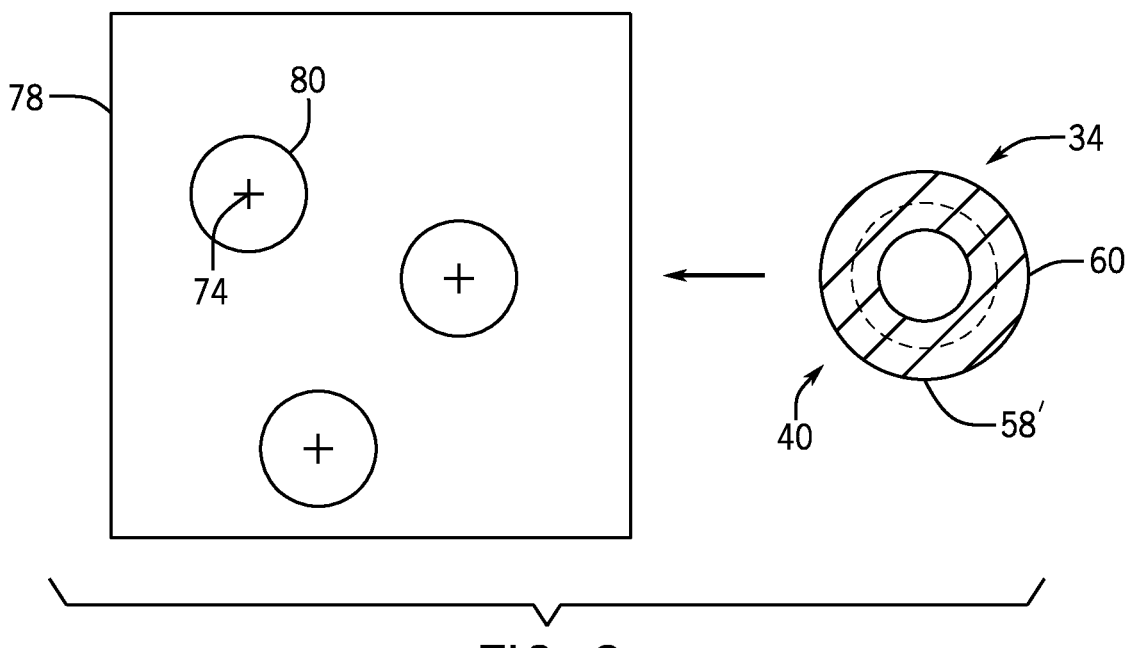
FIG. 3 is a figure similar to that of FIG. 2 showing a more complex scanning pattern producing a ring of pixels for each point emitter.

More generally, and referring to FIG. 3, a set of scan lines 73 may be performed over the entire surface of the material of interest 16 to produce a scan image 78. These steps can be repeated for different locations 74 of the depletion beam's center forming a complete areal scan image where each pixel corresponds to the brightness of light emitted from point emitter 19a and detected by light detector 26 for each respective position 74a of the depletion step 64.

Figure 2:
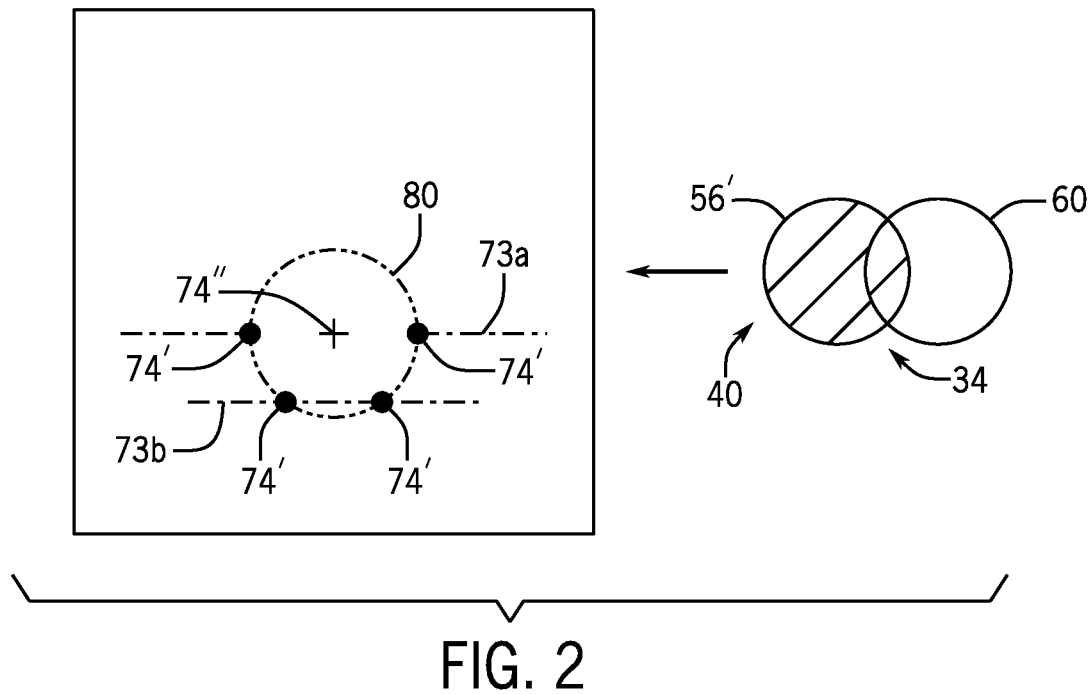
FIG. 2 is a schematic representation of an image obtained with the microscope of FIG. 1 using a simple scanning pattern producing small arcuate sets of pixels for each point emitter.

As shown in FIG. 2, scan image 78 formed from the multiple pixels collected in the process of scanning the location 74 over the entire surface of the material of interest will exhibit circles 80 about the location of a given point emitter 19 caused by the circular aperture formed by the region 60 offset from the various locations 74. Generally, and as noted above, these circles 80 will have a radius equal to the diameter 57 of the minimum intensity region 60 centered about a center of the diffraction pattern 34. The circles 80 form through successive scans when the arcuate aperture of the region 60 repeatedly illuminates the point emitter 19 at progressive offsets.

In order to extract the location of the point emitters 19 from the scan images 78 showing the circles 80 (or symmetric peaks in the case of a linear scan), at process block 82, the computer 44 may process the scan image 78 to identify the underlying circles 80 and associate the pixels of each circle 80 with a given point emitter 19 at an inferred location at the center of the radius defined by the circle 80. Once a circle 80 is identified per process block 82, the associated pixels of that circle 80 may be processed combined with other pixels corresponding to the point emitter 19, for example, by summing the quantitative intensity values associated with each pixel, as part of an averaging or the like to provide a robust measure of emitted light from the point emitter 19. It will be appreciated that other statistics may be applied to these pixels, for example, for finding a median value which does not necessarily require a combining.

Figure 4:
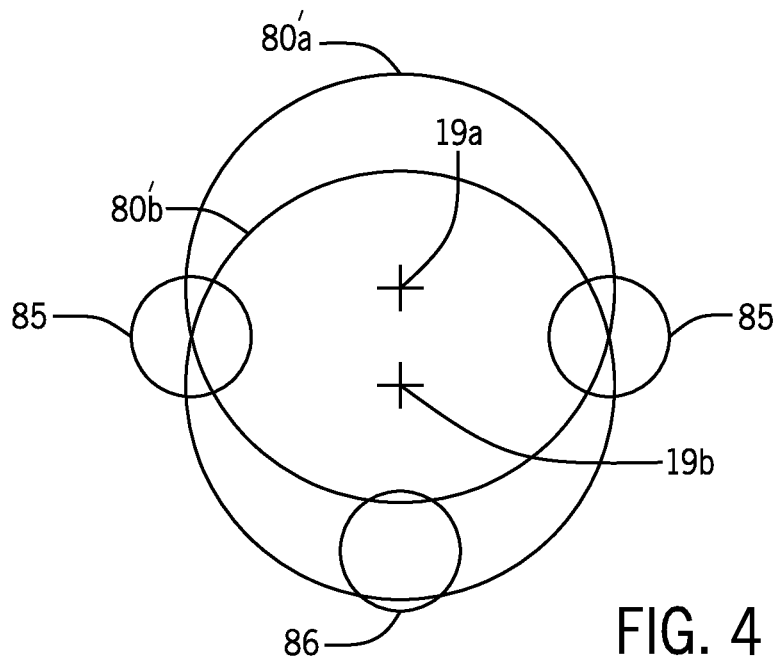
FIG. 4 is a detail view of two sets of pixels produced by closely adjacent point emitters showing regions of overlap and non-overlap.

Referring to FIG. 4, the present invention contemplates that two point emitters 19a and 19b may be resolved using the scan image 78 even though these point emitters 19 have a separation less than the diameter of their associated circles 80a and 80b. In this case the circles 80a and 80b may overlap at overlap regions 85 and be resolvable without overlap at regions 86. These regions may be identified geometrically from the information of process block 82 and used at process block 84 to adjust the combination of pixel values of each circle 80, for example, by omitting from the above described statistical calculations data from overlap regions 85 or by reducing the weight of the data of these pixel values, for example, by half.

Figure 6:
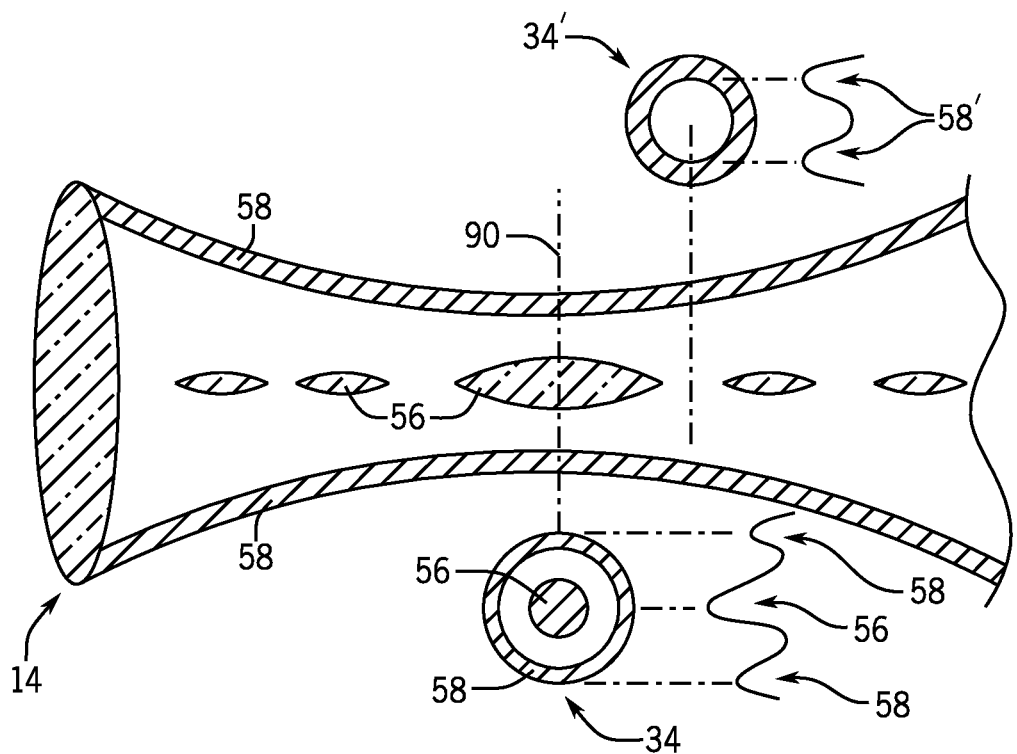
FIG. 6 is a simplified cross-section of light intensity for a diffraction pattern at a focal plane and removed from the focal plane showing an ability to modify the diffraction pattern by moving off focus.
Figure 7:
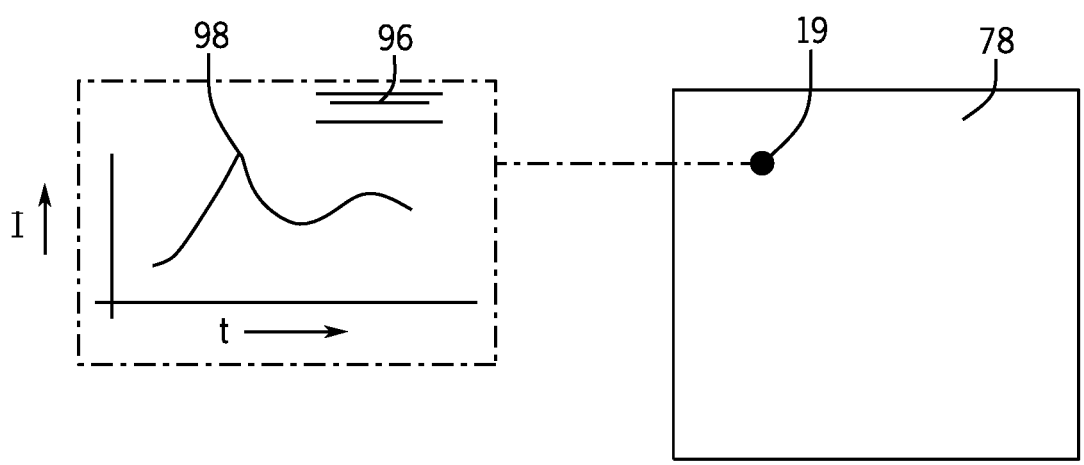
FIG. 7 is an example graphic output that may be produced by the present invention.

Referring now to FIG. 6, the diffraction pattern 34 produced by laser 30a occurs in the focal plane 90 of the objective lens 14. The inventors believe that it may be advantageous to perform the depletion step 64 with the focal plane 90 of the objective lens 14 offset from the object plane of the point emitter 19 such that the emitter 19 experiences a "defocused" diffraction pattern 34' during the depletion step. This focal plane displacement increases the amplitude of the side lobes 58' of the diffraction pattern 34' compared to diffraction pattern 34, potentially resulting in a sharpened and narrowed minimum intensity region 60. More fundamentally, it is believed that the central lobe 56 of diffraction pattern 34 may be fully suppressed to produce a doughnut shape diffraction pattern with a central circular region 60 comparable to that provided by a vortex plate. In this case, the central location of the depletion diffraction pattern 34 and readout diffraction pattern 40 may be identical and the circles 80 collapse to single points simplifying identification of the point emitters 19.

Referring now to FIG. 6 and FIG. 4, at process block 82, output data may be provided, for example, in the form of a point emitter image 78 providing images locating the point emitters 19, which may be located at separations less than the diffraction limit. The output data may be provided, for example, by illuminated pixels with the pixel locations being extracted as a center of the circles 80 and the scan image, and the pixel brightness being derived from a combined value for all of the pixels in the circle 80 for the particular point emitters 19 per process block 82. Similarly, for each point emitter 19, quantitative intensity data 96 and a time plot of intensity versus time 98, when that is desired, may be provided.

It will be appreciated that each of the lasers 30a, 30b, and 30c may be separate or combined, for example, by using multiple laser wavelengths or by use of point emitters 19 that can share any of the, initialization, depletion, and readout frequencies. Separate lasers allow for ready adjustment of laser wavelength, for simultaneous rather than sequential operation, and for providing different focal planes without mechanical focus adjustment in between each scan location.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A super-resolution microscope comprising:
at least one laser;

a light sensor;
a diffraction element positioned between the at least one laser and a material of interest to project a diffraction pattern at a focal plane having a central illumination spot surrounded by concentric spaced rings of illumination to produce in the material of interest at a measurement region a region of low light intensity flanked by regions of higher light intensity, the region of low light intensity having a width with an intensity insufficient to deplete a previously excited, predetermined fluorescent emitter and less than the diffraction limit for light of the at least one laser, the regions of higher intensity having an intensity sufficient to deplete the fluorescent emitters; and
an electronic computer executing a program stored in non-transitory media to:
(a) control the at least one laser to stimulate a fluorescent emitter in the material of interest;
(b) control the at least one laser to project a first diffraction pattern on the material of interest so that the fluorescent emitter is positioned within the region of low light intensity and that fluorescence outside of the region of low light intensity is depleted; and
(c) after (b) detect emitted light from the material of interest to provide a high spatial resolution measurement of emitted light constrained by the region of low light intensity.

2. The super-resolution microscope of claim 1 wherein the width of the region of low light intensity is less half the diffraction limit for light of the at least one laser.

3. The super-resolution microscope of claim 1 wherein the stimulation of fluorescence of the fluorescent emitter employs a second diffraction pattern at a focal plane having a central illumination spot surrounded by concentric spaced rings of illumination to produce a region of low light intensity and a region of higher light intensity, the region of higher light intensity of the second diffraction pattern aligned with the region of lower light intensity of the first diffraction pattern.

4. The super-resolution microscope of claim 3 wherein the stimulation of fluorescence of the fluorescent emitter employs a second diffraction pattern offset from the first diffraction pattern perpendicular to a direction of light propagation.

5. The super-resolution microscope of claim 1 further including a stage holding the material of interest in moving the material of interest between repetitions of (a)-(c) to collect a high spatial resolution image of emitted light.

6. The super-resolution microscope of claim 5 wherein the high spatial resolution image maps light from the fluorescent emitter in the material of interest to multiple pixels in a radius about a location of the fluorescent emitter in the high spatial resolution image, the radius corresponding to a radius of the first intensity minimum ring of an Airy disk diffraction pattern.

7. The super-resolution microscope of claim 6 further including a user interface and wherein the electronic computer provides a human readable output to a user through the user interface derived from a combination of the multiple pixels.

8. The super-resolution microscope of claim 7 wherein the light intensity minimum is a first intensity minimum ring from a center of an Airy disk diffraction pattern.

9. The super-resolution microscope of claim 8 wherein the electronic computer further identifies different sets of multiple pixels corresponding to different fluorescent emitters and isolates values of the different sets of multiple pixels to particular fluorescent emitters to provide different outputs associated with different fluorescent emitters.

10. The super-resolution microscope of claim 9 wherein the different sets of multiple pixels overlap in the high spatial resolution image, and the electronic computer further identifies overlap regions to provide a different weighting to the overlap regions compared to regions that do not overlap in the combination of the multiple pixels to provide the output for each fluorescent emitter.

11. The super-resolution microscope of claim 1 wherein a focal plane of the diffraction pattern is offset from a plane of the fluorescent emitter.

12. The super-resolution microscope of claim 11 wherein the region of low light intensity is at a center of the diffraction pattern and the regions of higher light intensity are a ring around the region of low light intensity.

13. The super-resolution microscope of claim 1 further including a material of interest of diamond with nitrogen vacancies and wherein the light is collected from nitrogen vacancies.

14. A method of super-resolution microscopy employing an optical system having at least one laser, a light sensor, and a diffraction element positioned between the at least one laser and a material of interest to project a diffraction pattern at a focal plane having a central illumination spot surrounded by concentric spaced rings of illumination to produce in the material of interest at a measurement region, a region of low light intensity flanked by regions of higher light intensity, the region of low light intensity having a width between the regions of higher light intensity less than the diffraction limit for light of the at least one laser and an intensity sufficient to deplete a predetermined flow; the method providing:
(a) operating the at least one laser to stimulate a fluorescent emitter in the material of interest;
(b) controlling the at least one laser to project a first diffraction pattern on the material of interest so that the fluorescent emitter is positioned within the region of low light intensity and that the fluorescence outside of the region of low light intensity is depleted; and
(c) after (b) detecting emitted light from the material of interest to provide a high spatial resolution measurement of emitted light constrained by the region of low light intensity.

15. The method of claim 14 wherein the region of low light intensity has a width between the regions of higher light intensity less half the diffraction limit for light of the at least one laser.

16. The method of claim 14 wherein the stimulation of fluorescence of at the least one fluorescent emitter employs a second diffraction pattern at a focal plane having a central illumination spot surrounded by concentric rings of illumination to produce a region of low light intensity and a region of higher light intensity, the region of higher light intensity of the second diffraction pattern aligned with the region of lower light intensity of the first diffraction pattern.

17. The method of claim 14 wherein the optical system further includes a stage holding the material of interest in moving the material of interest between repetitions of (a)-(c) to collect a high spatial resolution image of emitted light.

18. The method of claim 14 wherein the light intensity minimum is a first intensity minimum ring from a center of an Airy disk diffraction pattern.

19. The method of claim 14 wherein a focal plane of the diffraction pattern is offset from a focal plane of the light detector to provide a diffraction pattern wherein the region of low light intensity is at a center of the diffraction pattern and the regions of higher light intensity are a ring around the region of low light intensity.

20. The method of claim 14 wherein the material of interest is diamond with nitrogen vacancies providing the fluorescent emitter.

\* \* \* \* \*